(12) United States Patent
Odate

(10) Patent No.: US 9,643,620 B2
(45) Date of Patent: May 9, 2017

(54) AUTOMATIC OPERATION VEHICLE CONTROL APPARATUS

(71) Applicant: HONDA MOTOR CO., LTD., Tokyo (JP)

(72) Inventor: Shotaro Odate, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/822,036

(22) Filed: Aug. 10, 2015

(65) Prior Publication Data

US 2016/0039428 A1 Feb. 11, 2016

(30) Foreign Application Priority Data

Aug. 11, 2014 (JP) ................................. 2014-163576

(51) Int. Cl.
*B60W 50/08* (2012.01)
*G05D 1/00* (2006.01)

(52) U.S. Cl.
CPC ......... *B60W 50/082* (2013.01); *G05D 1/0061* (2013.01); *B60W 2400/00* (2013.01); *G05D 2201/0213* (2013.01)

(58) Field of Classification Search
CPC .............. B60W 50/082; G05D 1/0061; G05D 2201/0213; B60Q 1/0082; B60Q 1/343; B60Q 1/40; B62D 1/046; B62D 15/025; B62D 15/00; F16H 59/02
USPC .......................................................... 701/23
See application file for complete search history.

(56) References Cited

U.S. PATENT DOCUMENTS

| 8,880,287 B2 * | 11/2014 | Lee ...................... B62D 5/0481 |
| | | 701/34.4 |
| 2006/0285725 A1* | 12/2006 | Recce ..................... B60R 25/04 |
| | | 382/115 |
| 2008/0269015 A1* | 10/2008 | Ochiai ................... B60K 26/02 |
| | | 477/209 |
| 2011/0210867 A1* | 9/2011 | Benedikt .................. G08G 1/01 |
| | | 340/905 |
| 2012/0055279 A1* | 3/2012 | Van Saanen ............. G05G 1/32 |
| | | 74/513 |
| 2013/0317699 A1* | 11/2013 | Urhahne ................ B62D 15/00 |
| | | 701/41 |

(Continued)

FOREIGN PATENT DOCUMENTS

| JP | 11-286280 A | 10/1999 |
| JP | 2005-67322 A | 3/2005 |
| JP | 2012-51441 A | 3/2012 |

*Primary Examiner* — McDieunel Marc
*Assistant Examiner* — James E Stroud
(74) *Attorney, Agent, or Firm* — Westerman, Hattori, Daniels & Adrian, LLP

(57) ABSTRACT

An automatic operation vehicle control apparatus includes a contact detecting unit, an override detecting unit, and an automatic operation control unit. The contact detecting unit detects the presence of contact of a hand or hands of a driver with a steering wheel of a vehicle. The override detecting unit detects the presence of override on the steering wheel by the driver on the basis of the result of the detection by the contact detecting unit. The automatic operation control unit switches the operation mode at least including the automatic operation and the manual operation of the vehicle on the basis of the result of the detection by the override detecting unit.

7 Claims, 5 Drawing Sheets

(56) References Cited

U.S. PATENT DOCUMENTS

| | | | |
|---|---|---|---|
| 2015/0002391 A1* | 1/2015 | Chen | G06F 3/017 345/156 |
| 2016/0001781 A1* | 1/2016 | Fung | G06F 19/345 701/36 |
| 2016/0137217 A1* | 5/2016 | Golomb | B60Q 1/0082 74/473.3 |

* cited by examiner

AUTOMATIC OPERATION VEHICLE CONTROL APPARATUS

CROSS REFERENCES TO RELATED APPLICATIONS

The present application claims priority under 35 U.S.C. §119 to Japanese Patent Application No. 2014-163576, filed Aug. 11, 2014, entitled "Automatic Operation Vehicle Control Apparatus." The contents of this application are incorporated herein by reference in their entirety.

BACKGROUND

1. Field

The present disclosure relates to an automatic operation vehicle control apparatus.

2. Description of the Related Art

Technologies in related art are known in which automatic operation is switched to manual operation when override (a manual operation) of a driver is detected during the automatic operation of a vehicle and the manual operation is switched to the automatic operation when no override is detected (for example, refer to Japanese Unexamined Patent Application Publication No. 2012-51441).

In addition, technologies in the related art are known in which a torque exerted on a steering wheel is detected with a unit that detects override to determine the steering torque of the steering by a driver (for example, refer to Japanese Unexamined Patent Application Publication No. 11-286280 and Japanese Unexamined Patent Application Publication No. 2005-067322).

However, with the above technologies, it is necessary to discriminate between an input from a road surface and the driver's intent and to determine the difference between a certain target torque and the steering torque from feedback in order to determine the presence of override using the steering torque. Accordingly, there are problems in that it is necessary to provide a temporal determination threshold value and, thus, it is difficult to immediately determine the presence of override.

Also when the presence of override is determined by detecting the magnitude of pressure exerted on the steering wheel from a hand of a driver, it is necessary to continuously detect the variation in magnitude of the pressure. In this case, there is a problem in that the time required to determine the presence of override is increased depending on whether the variation in magnitude of the pressure exceeds a predetermined threshold value.

SUMMARY

It is desirable to provide an automatic operation vehicle control apparatus capable of immediately determining the presence of override and quickly switching an operation mode at least including automatic operation and manual operation.

(1) In an exemplary embodiment according to the present invention, an automatic operation vehicle control apparatus includes an override detecting unit (an override detector) that detects the presence of override (an override operation) on a steering wheel by a driver of a vehicle; and a control unit (a controller) that switches an operation modes including at least automatic operation and manual operation of the vehicle on the basis of a result of the detection by the override detecting unit. The steering wheel includes a contact detecting unit (a hand contact detector) that detects the presence of typically-physical direct contact with a hand of the driver. The override detecting unit detects the presence of override on the basis of a result of the detection by the contact detecting unit. The term "override" used in this application is intended to generally mean that an ability or allowance for a driver to manually add, correct, change, supplement, or suspend part or the entirety of the driving operation of the vehicle during its automatic driving operation modes, which may include the in-part automatic and/or in-part manual driving operations which allow the driver to manually operate only part of the otherwise automatic driving operation. The term "override operation" used in this application means a driver's manual driving operation on a vehicle operation system such as driver's steering motions on a steering wheel.

(2) In the automatic operation vehicle control apparatus described in (1), the contact detecting unit preferably determines that the hand of the driver is in contact with the steering wheel if a typically-physical direct contact area between the steering wheel and the hand of the driver is higher than or equal to a predetermined value.

(3) In the automatic operation vehicle control apparatus described in (1), the contact detecting unit preferably determines whether the contact with the steering wheel is made with only one hand or both hands of the driver or the contact with the steering wheel is not made, and the control unit preferably switches the operation mode on the basis of the result of the detection by the contact detecting unit.

(4) In the automatic operation vehicle control apparatus described in (1), the control unit preferably switches the operation mode to a manual operation mode in which all operations concerning driving of the vehicle are performed by the driver if the result of the detection by the contact detecting unit indicates that the contact is made with both hands of the driver.

(5) In the automatic operation vehicle control apparatus described in (1), the control unit preferably switches the operation mode to a semi-automatic operation mode in which only part of operations concerning driving of the vehicle is performed by the driver autonomously if the result of the detection by the contact detecting unit indicates that the contact is made with only one hand of the driver.

(6) In the automatic operation vehicle control apparatus described in (1), the contact detecting unit preferably determines whether the contact with the steering wheel is made with only one hand or both hands of the driver using two electrodes and a difference in voltage between the two electrodes. The two electrodes are provided on left and right sides of the steering wheel at a straight position.

(7) In the automatic operation vehicle control apparatus described in (6), each of the electrodes is preferably formed of paint that is to be applied on a surface of the steering wheel and that contains conductive material.

(8) In the automatic operation vehicle control apparatus described in (6), the contact detecting unit preferably further includes a heartbeat detector that detects a heartbeat of the driver on the basis of a fact that the difference in voltage has certain relationship when the left and right electrodes are in contact with both hands of the driver. The contact detecting unit preferably determines that the contact with the steering wheel is made with both hands of the driver if the heartbeat of the driver is detected by the heartbeat detector.

Since the automatic operation vehicle control apparatus described in (1) includes the override detecting unit, which detects the presence of override on the basis of the presence of contact of the hand(s) of the driver with the steering wheel, it is possible to immediately determine the presence of override and quickly switch the operation mode. Since the automatic operation vehicle control apparatus described in (1) includes the contact detecting unit, which detects the presence of contact of the hand(s) of the driver with the steering wheel, it is possible to quickly perform the detection at least on the basis of the presence of an output from the contact detecting unit without providing a temporal threshold value.

Since the automatic operation vehicle control apparatus described in (2) includes the contact detecting unit, which detects the presence of contact of the hand(s) of the driver with the steering wheel on the basis of the contact area between the steering wheel and the hand(s) of the driver, it is possible to more accurately detect the presence of contact with the hand(s) of the driver while quickly performing the detection.

Since the automatic operation vehicle control apparatus described in (3) includes the contact detecting unit, which determines whether the contact with the steering wheel is made with only one hand or both hands of the driver or the contact with the steering wheel is not made, it is possible to detect the driver's intent in detail. Since the automatic operation vehicle control apparatus described in (3) includes the control unit, which switches the operation mode on the basis of whether the contact with the steering wheel is made with only one hand or both hands of the driver or the contact with the steering wheel is not made, it is possible to automatically select an operation mode optimal for the operation status.

Since the automatic operation vehicle control apparatus described in (4) includes the control unit, which switches the operation mode to the manual operation mode when the contact with the steering wheel is made with both hands of the driver, it is possible to accurately reflect the driver's intent in the switching of the operation mode.

Since the automatic operation vehicle control apparatus described in (5) includes the control unit, which switches the operation mode to the semi-automatic operation mode when the contact with the steering wheel is made with one hand of the driver, it is possible to determine the driver's intent in detail and reflect the driver's intent in the vehicle control.

In the automatic operation vehicle control apparatus described in (6), it is possible to precisely determine whether the contact is made with both hands or one hand of the driver while preventing increase in cost for the configuration, compared with, for example, a case in which a camera is used.

In the automatic operation vehicle control apparatus described in (7), it is possible to build the system having high sense of design while preventing increase in cost for the configuration.

Since the automatic operation vehicle control apparatus described in (8) includes the contact detecting unit, which determines that the contact with the steering wheel is made with both hands of the driver when the heartbeat of the driver is detected, it is possible to more accurately detect the contact state of the hands of the driver.

DESCRIPTION OF THE PREFERRED EMBODIMENTS

Embodiments of the present disclosure will herein be described with reference to the attached drawings.

Figure 1:
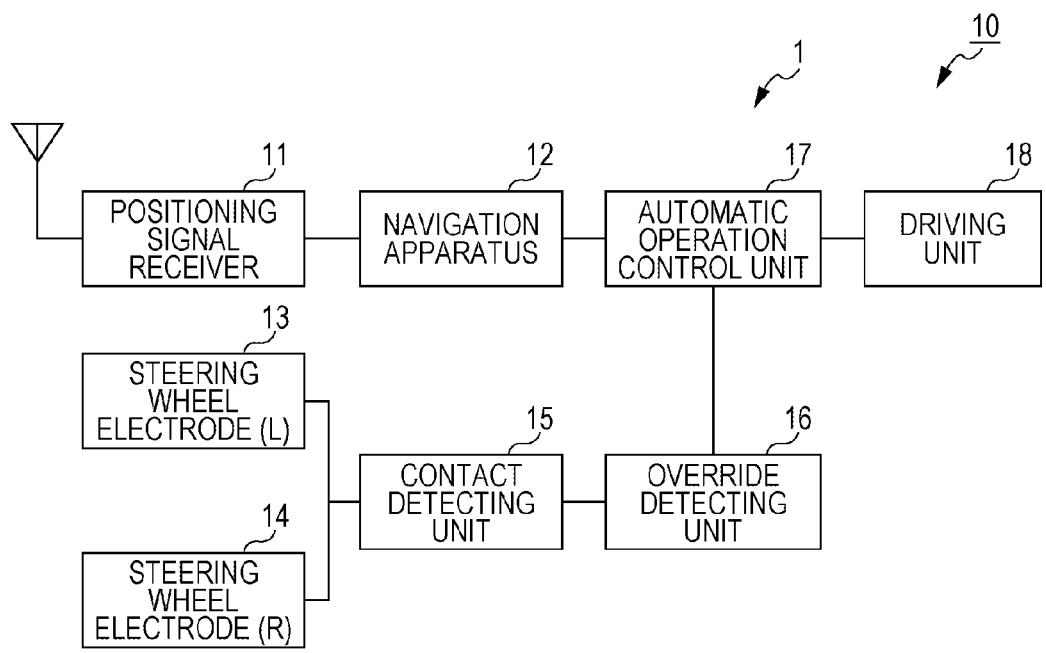
FIG. 1 is a block diagram illustrating an exemplary configuration of an automatic operation vehicle control apparatus according to an embodiment of the present disclosure.

An automatic operation vehicle control apparatus 10 according to an embodiment of the present disclosure is mounted in a vehicle 1. Referring to FIG. 1, the automatic operation vehicle control apparatus 10 includes a positioning signal receiver 11, a navigation apparatus 12, a steering wheel electrode (L) 13, a steering wheel electrode (R) 14, a contact detecting unit 15, an override detecting unit 16, an automatic operation control unit 17, and a driving unit 18.

The positioning signal receiver 11 receives a positioning signal from a positioning system (for example, a global positioning system (GPS) or a global navigation satellite system (GNSS)) to detect the current position of the vehicle 1.

The navigation apparatus 12 acquires the current position of the vehicle 1 from the positioning signal receiver 11. The navigation apparatus 12 performs route guidance or route search from the current position to a destination through a middle point using map data that is stored in the navigation apparatus 12 in advance or map data that is acquired from an external server apparatus (not illustrated). The destination and the middle point are input by a driver.

The map data includes, for example, road coordinate data indicating position coordinates on each road, which are necessary to perform map matching based on information about the current position of the vehicle 1, and road map data necessary to calculate a guide route. The road map data includes, for example, information about nodes, links, link costs, road shapes, automatic operation areas, and road types. The nodes are coordinate points composed of the latitudes and the longitudes of certain points, such as intersections or branch points, on the roads. The links are lines connecting the nodes and are road segments connecting points. The link costs are information indicating the distances between the road segments corresponding to the links or the times required to move between the road segments.

The navigation apparatus 12 may perform an autonomous navigation arithmetic process based on, for example, the speed or the yaw rate of the vehicle 1 to detect the current position of the vehicle 1 using both the result of the arithmetic process and the current position of the vehicle 1, which is detected by the positioning signal receiver 11.

Figure 2:
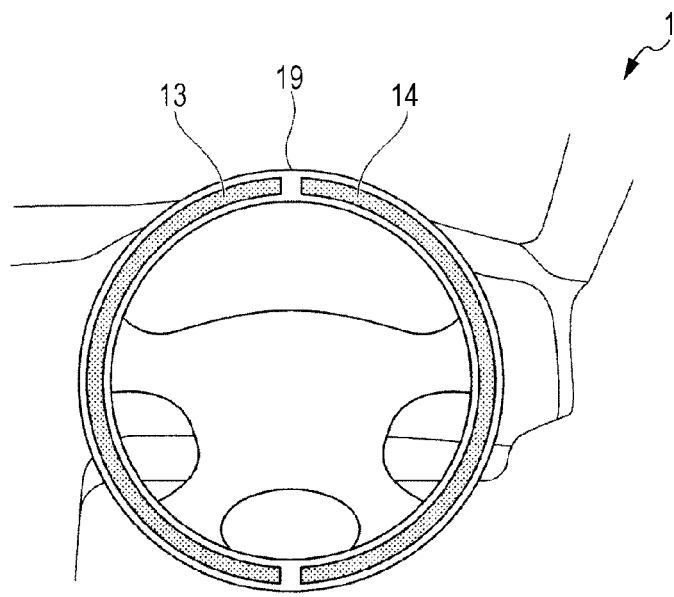
FIG. 2 illustrates exemplary electrodes in a steering wheel in the automatic operation vehicle control apparatus according to embodiment of the present disclosure.

The steering wheel electrode (L) 13 and the steering wheel electrode (R) 14 are provided on left and right sides, respectively, of a steering wheel 19 at a straight position (neutral position), as illustrated in FIG. 2. The steering wheel electrode (L) 13 and the steering wheel electrode (R) 14 are provided part or the whole of an inner periphery, an outer periphery, a side face, or the like of the steering wheel 19. The steering wheel electrode (L) 13 and the steering wheel electrode (R) 14 may be formed of any conductive material. For example, the steering wheel electrode (L) 13 and the steering wheel electrode (R) 14 may be formed of paint that is to be applied on the surface of the steering wheel 19 and that contains conductive material, or conductive leather material.

The contact detecting unit 15 detects the presence of contact of a hand or hands of the driver with the steering wheel 19. The contact detecting unit 15 determines that the hand(s) of the driver is (are) in contact with the steering wheel 19 if the contact area between the steering wheel 19 and the hand(s) of the driver is greater than or equal to a certain value. The contact detecting unit 15 determines the size of the contact area between the steering wheel 19 and the hand(s) of the driver on the basis of variations in resistance value of the steering wheel electrode (L) 13 and the steering wheel electrode (R) 14. The contact detecting unit 15 sets the certain value, which is a determination threshold value for the contact area between the steering wheel 19 and the hand(s) of the driver, for example, on the basis of the size of a hand of a general human body model.

The contact detecting unit 15 determines whether the contact with the steering wheel 19 is made with only one hand of the driver or with both hands of the driver using the difference in voltage between the steering wheel electrode (L) 13 and the steering wheel electrode (R) 14.

The contact detecting unit 15 detects the heartbeat of the driver on the basis of the fact that the difference in voltage has certain relationship when the contact with the steering wheel electrode (L) 13 and the steering wheel electrode (R) 14 is made with both hands of the driver. The contact detecting unit 15 determines that the contact with the steering wheel 19 is made with both hands of the driver when the heartbeat of the driver is detected.

Figure 3:
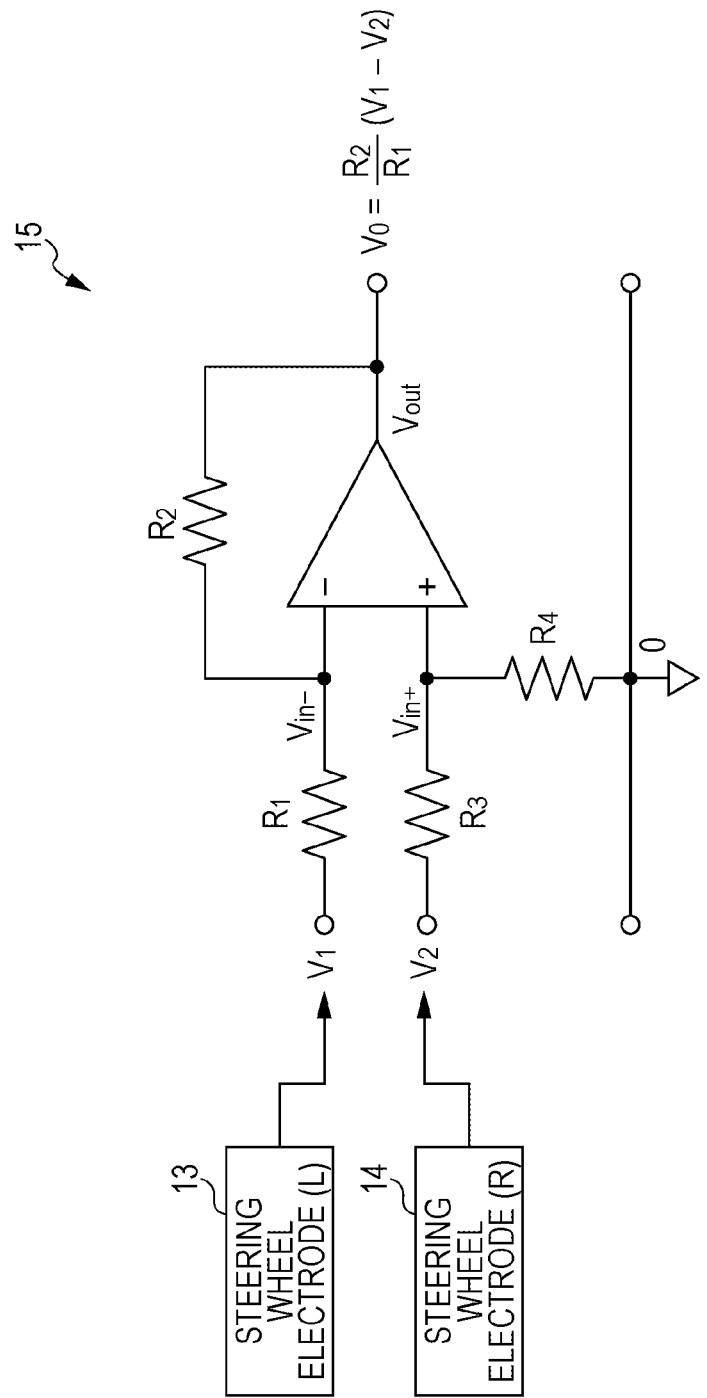
FIG. 3 illustrates an exemplary configuration of a contact detecting unit in the automatic operation vehicle control apparatus according to the embodiment of the present disclosure.

The contact detecting unit 15 includes a differential amplifier circuit, as illustrated in FIG. 3. The differential amplifier circuit includes an input resistor $R_1$ and a feedback resistor $R_2$ connected to an inverting input terminal of an operational amplifier and an input resistor $R_3$ and a grounding resistor $R_4$ connected to a non-inverting input terminal of the operational amplifier. The resistance of the input resistor $R_1$ is equal to the resistance of the input resistor $R_3$, and the resistance of the feedback resistor $R_2$ is equal to the resistance of the grounding resistor $R_4$. Voltage $V_o$ output from the contact detecting unit 15 is represented according to Equation (1) using voltage $V_1$ of the steering wheel electrode (L) 13, voltage $V_2$ of the steering wheel electrode (R) 14, and the resistances of the resistors $R_1$ and $R_2$:

$$V_o = (R_2/R_1) \times (V_1 - V_2) \quad (1)$$

Figure 4:
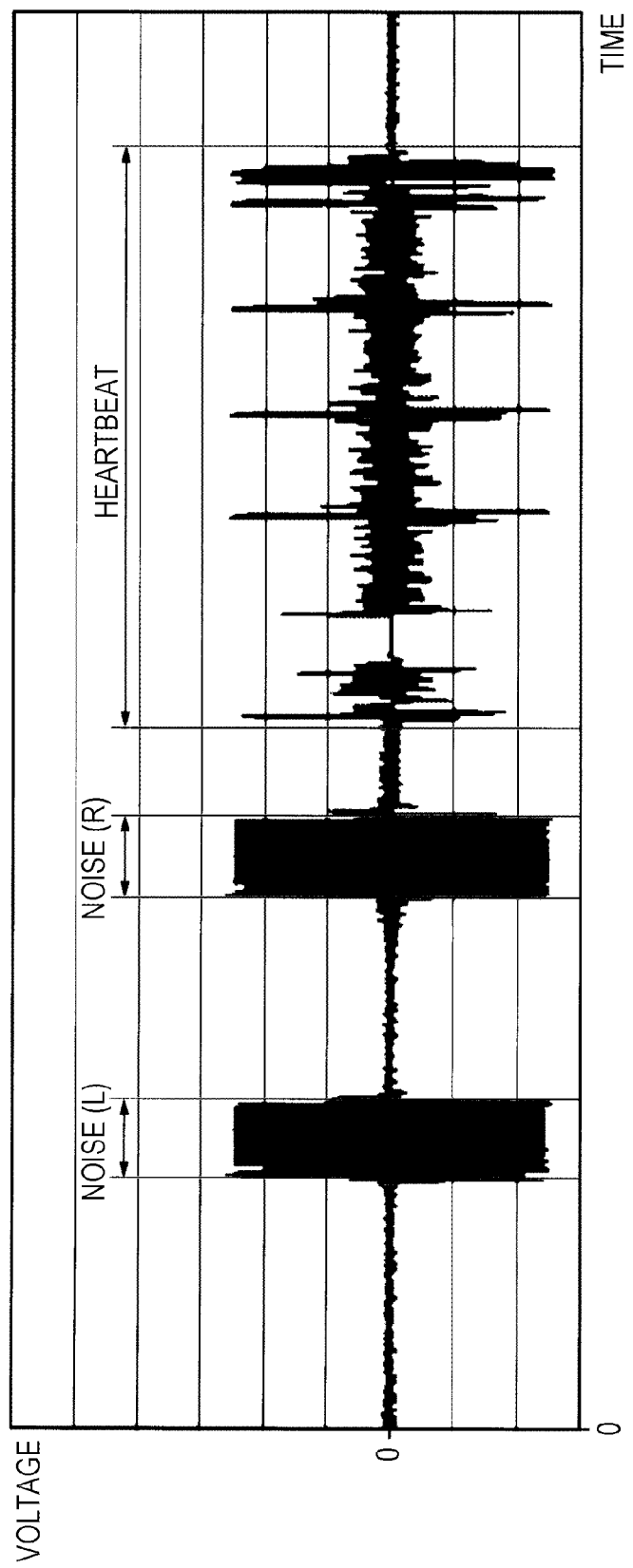
FIG. 4 illustrates an exemplary voltage waveform output from the contact detecting unit in the automatic operation vehicle control apparatus according to the embodiment of the present disclosure.

The voltage $V_1$ or the voltage $V_2$ is equal to zero when the contact with the steering wheel 19 is made with only one hand of the driver. Accordingly, as illustrated in FIG. 4, the contact detecting unit 15 outputs noise (R) according to $(R_2/R_1) \times V_2$ or noise (L) according to $(R_2/R_1) \times V_1$.

When the contact with the steering wheel 19 is made with both hands of the driver, the contact detecting unit 15 receives in-phase noise from the steering wheel electrode (L) 13 and the steering wheel electrode (R) 14. In this case, the contact detecting unit 15 cancels the noise of the steering wheel electrode (L) 13 with the noise of the steering wheel electrode (R) 14 and, as illustrated in FIG. 4, outputs a signal of the heartbeat of the driver according to $(R_2/R_1) \times (V_1 - V_2)$.

The override detecting unit 16 detects the presence of override on the steering wheel 19 by the driver in accordance with the result of the detection by the contact detecting unit 15 of the contact of the hand(s) of the driver with the steering wheel 19.

The automatic operation control unit 17 controls automatic operation of the vehicle 1 with the driving unit 18 using information about the current position of the vehicle 1 and information indicating whether the automatic operation area exists on the guide route, which are acquired from the navigation apparatus 12, and information indicating the presence of override, which is acquired from the override detecting unit 16.

When the result of the detection by the contact detecting unit 15 in the automatic operation area indicates the contact with both hands of the driver, the automatic operation control unit 17 switches the operation mode of the vehicle 1 to a manual operation mode in which all the operations concerning the driving of the vehicle 1 are performed by the driver.

Figure 5:
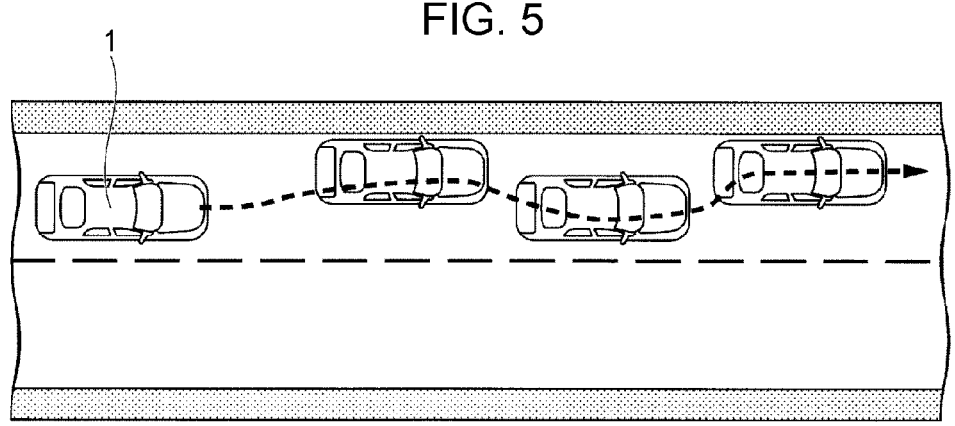
FIG. 5 illustrates an exemplary behavior of a vehicle in a semi-automatic operation mode of the automatic operation vehicle control apparatus according to the embodiment of the present disclosure.

When the result of the detection by the contact detecting unit 15 in the automatic operation area indicates the contact with one hand of the driver, the automatic operation control unit 17 switches the operation mode of the vehicle 1 to a semi-automatic operation mode in which only part of the operations concerning the driving of the vehicle 1 is performed by the vehicle 1 autonomously. In the semi-automatic operation mode, for example, as illustrated in FIG. 5, the automatic operation control unit 17 permits part of the steering operations by the driver for avoidance of an obstacle, passing of a vehicle ahead of the vehicle 1, lane change, or the like while automatically controlling the steering so that the vehicle 1 does not run out of the road.

When the result of the detection by the contact detecting unit 15 in the automatic operation area indicates non-contact, the automatic operation control unit 17 switches the operation mode of the vehicle 1 to an automatic operation mode in which all the operations concerning the driving of the vehicle 1 are performed by the vehicle 1 autonomously.

When the result of the detection by the contact detecting unit 15 indicates the contact with both hands of the driver or the contact with one hand of the driver after the vehicle 1 has passed the automatic operation area, the automatic operation control unit 17 switches the operation mode of the vehicle 1 to the manual operation mode.

Figure 6:
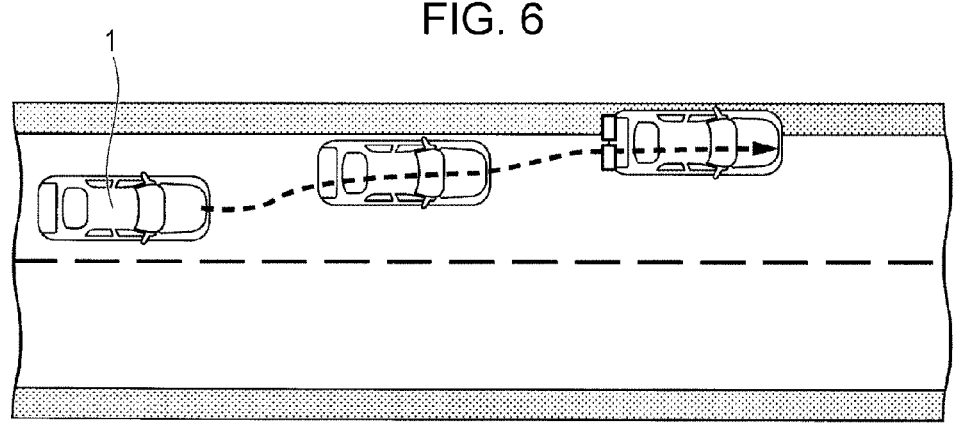
FIG. 6 illustrates an exemplary behavior of a vehicle when an automatic operation mode of the automatic operation vehicle control apparatus according to the embodiment of the present disclosure is finished.

When the result of the detection by the contact detecting unit 15 indicates non-contact after the vehicle 1 has passed the automatic operation area, the automatic operation control unit 17 switches the operation mode of the vehicle 1 to, for example, a stopping-on-road-shoulder mode. In the stopping-on-road-shoulder mode, for example, as illustrated in FIG. 6, the automatic operation control unit 17 stops the vehicle 1 on a shoulder of the road while blinking a hazard flasher of the vehicle 1.

The driving unit 18 includes an internal combustion engine or a motor, which serves as a driving source of the vehicle 1, a brake actuator, a steering actuator, and so on.

Figure 7:
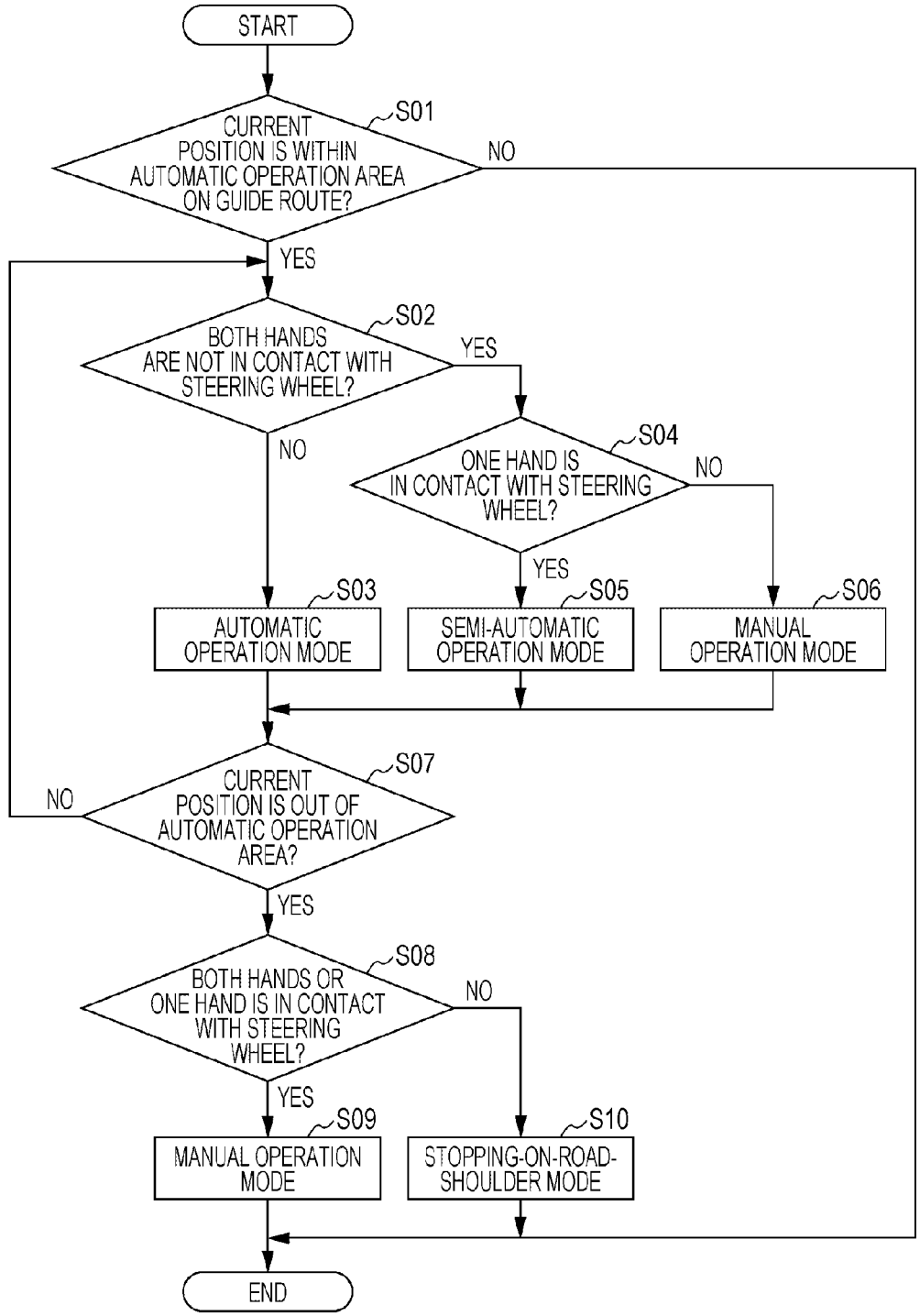
FIG. 7 is a flowchart illustrating an exemplary operational process of the automatic operation vehicle control apparatus according to the embodiment of the present disclosure.

FIG. 7 is a flowchart illustrating an exemplary operational process of the automatic operation vehicle control apparatus 10 according to the present embodiment of the present disclosure, which has the above configuration.

Referring to FIG. 7, in Step S01, the automatic operation control unit 17 determines whether the current position of the vehicle 1 is within the automatic operation area on the guide route.

If the automatic operation control unit 17 determines that the current position of the vehicle 1 is not within the automatic operation area on the guide route (NO in Step S01), the process is terminated.

If the automatic operation control unit 17 determines that the current position of the vehicle 1 is within the automatic operation area on the guide route (YES in Step S01), the process goes to Step S02.

In Step S02, the automatic operation control unit 17 determines whether both hands of the driver are not in contact with the steering wheel 19.

If the automatic operation control unit 17 determines that both hands of the driver are in contact with the steering wheel 19 (YES in Step S02), the process goes to Step S04.

If the automatic operation control unit 17 determines that both hands of the driver are not in contact with the steering wheel 19 (NO in Step S02), the process goes to Step S03.

In Step S03, the automatic operation control unit 17 switches the operation mode of the vehicle 1 to the automatic operation mode.

In Step S04, the automatic operation control unit 17 determines whether only one hand of the driver is in contact with the steering wheel 19.

If the automatic operation control unit 17 determines that one hand of the driver is not in contact with the steering wheel 19 (NO in Step S04), the process goes to Step S06.

If the automatic operation control unit 17 determines that only one hand of the driver is in contact with the steering wheel 19 (YES in Step S04), the process goes to Step S05.

In Step S05, the automatic operation control unit 17 switches the operation mode of the vehicle 1 to the semi-automatic operation mode.

In Step S06, the automatic operation control unit 17 switches the operation mode of the vehicle 1 to the manual operation mode.

In Step S07, the automatic operation control unit 17 determines whether the current position of the vehicle 1 is out of the automatic operation area.

If the automatic operation control unit 17 determines that the current position of the vehicle 1 is not out of the automatic operation area (NO in Step S07), the process goes back to Step S02.

If the automatic operation control unit 17 determines that the current position of the vehicle 1 is out of the automatic operation area (YES in Step S07), the process goes to Step S08.

In Step S08, the automatic operation control unit 17 determines whether both hands or one hand of the driver is in contact with the steering wheel 19.

If the automatic operation control unit 17 determines that both hands and one hand of the driver is not in contact with the steering wheel 19 (NO in Step S08), the process goes to Step S10.

If the automatic operation control unit 17 determines that both hands or one hand of the driver is in contact with the steering wheel 19 (YES in Step S08), the process goes to Step S09.

In Step S09, the automatic operation control unit 17 switches the operation mode of the vehicle 1 to the manual operation mode. Then, the process is terminated.

In Step S10, the automatic operation control unit 17 switches the operation mode of the vehicle 1 to the stopping-on-road-shoulder mode. Then, the process is terminated.

As described above, since the automatic operation vehicle control apparatus 10 of the present embodiment includes the override detecting unit 16, which detects the presence of override on the basis of the presence of contact of the hand(s) of the driver with the steering wheel 19, it is possible to immediately determine the presence of override and quickly switch the operation mode. Since the automatic operation vehicle control apparatus 10 includes the contact detecting unit 15, which detects the presence of contact of the hand(s) of the driver with the steering wheel 19, it is possible to quickly perform the detection at least on the basis of the presence of an output from the contact detecting unit 15 without providing a temporal threshold value.

Since the automatic operation vehicle control apparatus 10 includes the contact detecting unit 15, which detects the presence of contact of the hand(s) of the driver with the steering wheel 19 on the basis of the contact area between the steering wheel 19 and the hand(s) of the driver, it is possible to more accurately detect the presence of contact with the hand(s) of the driver while quickly performing the detection.

Since the automatic operation vehicle control apparatus 10 includes the contact detecting unit 15, which determines whether the contact with the steering wheel 19 is made with only one hand or both hands of the driver or the contact with the steering wheel 19 is not made, it is possible to detect the driver's intent in detail. Since the automatic operation vehicle control apparatus 10 includes the automatic operation control unit 17, which switches the operation mode on the basis of whether the contact with the steering wheel 19 is made with only one hand or both hands of the driver or the contact with the steering wheel 19 is not made, it is possible to automatically select an operation mode optimal for the operation status.

Since the automatic operation vehicle control apparatus 10 includes the automatic operation control unit 17, which switches the operation mode to the manual operation mode when the contact with the steering wheel 19 is made with both hands of the driver, it is possible to accurately reflect the driver's intent in the switching of the operation mode.

Since the automatic operation vehicle control apparatus 10 includes the automatic operation control unit 17, which switches the operation mode to the semi-automatic operation mode when the contact with the steering wheel 19 is made with one hand of the driver, it is possible to determine the driver's intent in detail and reflect the driver's intent in the vehicle control.

Since the automatic operation vehicle control apparatus 10 includes the steering wheel electrode (L) 13 and the steering wheel electrode (R) 14 in the steering wheel 19, it is possible to precisely determine whether the contact is made with both hands or one hand of the driver while preventing increase in cost for the configuration, compared with, for example, a case in which a camera is used.

Since each of the steering wheel electrode (L) 13 and the steering wheel electrode (R) 14 is formed of paint that is to be applied on the surface of the steering wheel 19 and that contains conductive material or conductive leather material, it is possible to build the system having high sense of design while preventing increase in cost for the configuration.

Since the automatic operation vehicle control apparatus 10 includes the contact detecting unit 15, which determines that the contact with the steering wheel 19 is made with both hands of the driver when the heartbeat of the driver is detected, it is possible to more accurately detect the contact state of the hands of the driver.

Modifications of the above embodiments will now be described.

Although the contact detecting unit 15 includes the differential amplifier circuit in the above embodiments, the differential amplifier circuit is not limitedly used. The contact detecting unit 15 may include another circuit using the difference in voltage between the steering wheel electrode (L) 13 and the steering wheel electrode (R) 14.

In the above embodiments, each of the steering wheel electrode (L) 13 and the steering wheel electrode (R) 14 may be, for example, a segmented electrode segmented into multiple portions.

Although the contact detecting unit 15 detects the contact of the hand(s) of the driver with the steering wheel 19 using the difference in voltage between the steering wheel electrode (L) 13 and the steering wheel electrode (R) 14 in the above embodiments, the detection of the contact of the hand(s) of the driver with the steering wheel 19 is not limited to the above manner.

The contact detecting unit 15 may include another sensor, instead of the steering wheel electrode (L) 13 and the steering wheel electrode (R) 14. The contact detecting unit 15 may include, for example, a camera that captures an image of the interior of the vehicle 1. The contact detecting unit 15 may determine whether the contact with the steering wheel 19 is made with only one hand or both hands of the driver from an image of the hand(s) of the driver and the steering wheel 19, which is captured by the camera.

Although the automatic operation control unit 17 switches the operation mode of the vehicle 1 to the manual operation mode when the result of the detection by the contact detecting unit 15 in the automatic operation area indicates the contact with both hands of the driver in the above embodiments, how to switch the operation mode is not limited to the above one. The automatic operation control unit 17 may switch the operation mode to the semi-automatic operation mode in the above case.

Although the automatic operation control unit 17 switches the operation mode of the vehicle 1 to the semi-automatic operation mode when the result of the detection by the contact detecting unit 15 in the automatic operation area indicates the contact with one hand of the driver in the above embodiments, how to switch the operation mode is not limited to the above one. The automatic operation control unit 17 may switch the operation mode to the manual operation mode in the above case.

While the present disclosure is described in terms of some specific examples and embodiments, it will be clear that the present disclosure is not limited to these specific examples and embodiments and that omission, replacement, and many changes and modifications may be made without departing from the true spirit and scope of the present disclosure. Such embodiments and modifications are included in the spirit and scope of the claims.

What is claimed is:

1. An automatic operation vehicle control apparatus comprising:
   a hand contact detector provided to a steering wheel of a vehicle and configured to detect a contact of a driver's hand with the steering wheel;
   an override detector that detects an override operation on a steering wheel by the driver, the override detector being configured to detect the override operation on a basis of a result of the hand detection by the hand contact detector; and
   a controller that configured to perform different operation modes comprising at least an automatic operation mode and a manual operation mode of the vehicle and to switch the operation modes on a basis of a result of the override detection by the override detector,
   wherein the hand contact detector comprises at least two electrodes respectively provided to one side and another opposite side of the steering wheel which are defined as left and right sides of the steering wheel when the steering wheel is at a straight position and is configured to detect a difference in voltage between the two electrodes, and
   wherein the hand contact detector determines whether one or both of the hands of the driver contact with the steering wheel on a basis of the detected difference in voltage between the two electrodes.

2. The automatic operation vehicle control apparatus according to claim 1,
   wherein the hand contact detector is configured to detect a contact area in which the hand of the driver is in contact with the steering wheel and to determine that the contact of the hand with the steering wheel occurs if the detected contact area is higher than or equal to a predetermined value.

3. The automatic operation vehicle control apparatus according to claim 1,
   wherein the hand contact detector is configured to detect the contact of each of both hands of the driver with the steering wheel and to determine whether only one of the hands contacts the steering wheel, or both of the hands contact the steering wheel, or none of the hands contacts with the steering wheel, and
   wherein the controller switches the operation modes on the basis of the result of the hand detection by the hand contact detector.

4. The automatic operation vehicle control apparatus according to claim 1,
   wherein the hand contact detector is configured to detect the contact of each of both hands of the driver with the steering wheel, and
   wherein the controller performs the manual operation mode which allows the driver to fully operate the driving operations of the vehicle when the hand contact detector detects the contacts of both hands of the driver.

5. The automatic operation vehicle control apparatus according to claim 1,
   wherein the hand contact detector is configured to detect the contact of each of both hands of the driver with the steering wheel,
   wherein the operation modes further comprises a semi-automatic operation mode which allows the driver to operate only part of the driving operations of the vehicle, and
   wherein the controller perform the semi-automatic operation mode when the hand contact detector detects the contact of only one of the hands of the driver.

6. The automatic operation vehicle control apparatus according to claim 1,
   wherein each of the electrodes is in a form of paint applied on a surface of the steering wheel, the paint containing conductive material.

7. The automatic operation vehicle control apparatus according to claim 1,
   wherein the hand contact detector further comprises a heartbeat detector configured to detect a heartbeat of the driver, the heartbeat being detected if the difference in voltage meets a predetermined relationship in a state where both hands of the driver contact with the respective left and right electrodes, and wherein the hand contact detector determines that both hands of the driver contact with the steering wheel if the hand contact detector detects the heartbeat of the driver.

* * * * *